United States Patent [19]
Hocquellet

[11] Patent Number: 5,232,534
[45] Date of Patent: Aug. 3, 1993

[54] THERMAL PROTECTION COATING, AND METHOD AND INSTALLATION FOR MANUFACTURING IT

[75] Inventor: Dominique Hocquellet, Saint Medard en Jalles, France

[73] Assignee: Aerospatiale Soiete Nationale Industrielle, Paris, France

[21] Appl. No.: 949,940

[22] Filed: Sep. 24, 1992

Related U.S. Application Data

[62] Division of Ser. No. 584,004, Sep. 18, 1990, Pat. No. 5,173,350.

[30] Foreign Application Priority Data

Sep. 19, 1989 [FR] France .................. 89 12283

[51] Int. Cl.⁵ .................. B31C 3/00; B32B 3/00
[52] U.S. Cl. .................. 156/189; 156/257
[58] Field of Search ......... 156/189, 190, 191, 192, 156/187, 188, 195, 257

[56] References Cited

U.S. PATENT DOCUMENTS

| | | | |
|---|---|---|---|
| 2,041,889 | 5/1936 | Wheeler | 156/189 X |
| 3,140,968 | 7/1964 | Barrios et al. | |
| 3,580,769 | 5/1971 | Parker | 156/253 X |
| 3,583,275 | 6/1971 | Duflos | 87/7 X |
| 3,596,604 | 8/1971 | Corkery | 102/105 X |
| 3,745,928 | 7/1973 | Kinnairo | 102/105 X |
| 3,821,050 | 6/1979 | Ambrose | 156/143 X |
| 3,960,626 | 6/1976 | Casadevall | 156/93 X |
| 3,960,636 | 6/1976 | Casadevall | 244/158 A |
| 4,119,451 | 10/1978 | Fuji | 156/253 X |
| 4,187,135 | 2/1980 | Yates | 156/187 X |
| 4,297,156 | 10/1981 | Dalle | 156/253 X |
| 4,428,998 | 1/1984 | Hawkinson | 428/240 X |
| 4,482,111 | 11/1984 | Le Touche | 244/158 A |
| 4,495,231 | 1/1985 | Laskaris | 428/36 X |
| 4,592,950 | 6/1986 | Le Touche | 244/158 A |
| 4,655,866 | 4/1987 | Ferrier | 156/192 |
| 4,793,409 | 12/1988 | Bridges | 156/187 X |
| 4,990,207 | 2/1991 | Sakai | 156/253 X |
| 5,173,350 | 12/1992 | Hocquellet | 428/163 X |

FOREIGN PATENT DOCUMENTS

| | | |
|---|---|---|
| 151868 | 11/1966 | France . |
| 2166542 | 8/1973 | France . |
| 2569237 | 2/1986 | France . |
| 2191115 | 12/1987 | United Kingdom . |

Primary Examiner—David A. Simmons
Assistant Examiner—Charles Rainwater
Attorney, Agent, or Firm—Browdy and Neimark

[57] ABSTRACT

A thermal protection coating for a surface having a reinforcement embedded in a thermally insulative material as a main layer. This layer is formed from a succession of refractory fibrous reinforcements parallel to each other and inclined at an angle to the surface being protected. Insulative layers are located between the reinforcements. An insulating sublayer is located between the surface and the main layer and is compatible with the main layer and the surface.

10 Claims, 4 Drawing Sheets

THERMAL PROTECTION COATING, AND METHOD AND INSTALLATION FOR MANUFACTURING IT

This is a division of copending parent application Ser. No. 07/584,004 filed Sep. 18, 1990, now U.S. Pat. No. 5,173,350.

The invention concerns thermal protection materials designed to cover objects which have to withstand a very high thermal flux for a relatively short time during which they must retain good mechanical strength characteristics.

It is directed to a coating for thermally protecting a surface, a method, in particular an automated method, for coating at least the exterior of a body of revolution (cylinder, cone or otherwise) with such thermal protection and an apparatus for implementing this method.

This kind of thermal protection is usually made from materials comprising a sandwich or winding of textile (braid, cut woven fabric, tape, fringes, etc) reinforcement layers of silica, glass, carbon or other refractory materials bonded by an elastomer or a resin (thermosetting or thermoplastic).

The thermal insulation function is then essentially provided by the binder (or matrix) while mechanical strength is provided by the layers of textile reinforcement which are degraded only at very high temperatures but which, on the other hand, are better conductors of heat than the binder. The binder is very quickly destroyed by heat whereas the reinforcement passes through a softening phase before it melts completely.

To preserve the integrity of the protection during thermal attack it is essential that part of the textile reinforcement is anchored in a part of the thermal protection coating that remains cool enough to prevent it becoming separated or uncovered prematurely.

For this reason the layers are generally perpendicular or inclined to the surface, rather than parallel to it. Known materials of this kind include "CLINOSTRASIL" and "ORTHOSTRASIL".

In some applications this type of material has an irredeemable defect, namely inadequate thermal insulation in the case of a moderate flux maintained for a relatively long time (example: 200 kW/m$^2$, for four minutes) interrupted by very high amplitude peaks with very short durations (example: 1 to 2 MW/m$^2$, for a few seconds). Because of the surface temperatures reached during the peaks the material must be mechanically strong at these temperatures, whereas because of the duration of the moderate flux thermal attack the material must be highly insulative.

Conventional materials (including the previously mentioned "CLINOSTRASIL" and "ORTHOSTRASIL" materials) are characterised by a very high fiber coefficient (by definition, but also because this is obligatory given their manufacturing processes, as will be explained later). These materials are therefore too good as conductors of heat.

To improve the insulation qualities, the layers of reinforcement can be inclined, which artificially lengthens the path of the heat flow in the fibers. However, this solution is limited to cylindrical or very slightly conical parts because with relatively high cone angles the inclined layers slip during manufacture.

Various fabrication methods are known for using these known materials.

In a first method (sometimes referred to as "CLINO" or "ORTHO" winding), a woven fabric or tape preimpregnated with thermosetting resin is wound layer by layer onto a former or directly onto the object to be coated. The angle of inclination between the axis of revolution and the layers is defined initially by a wedge supporting the first layer. After polymerization the coating is machined to the correct thickness.

This method has a number of disadvantages:

it is impossible to obtain materials with a very low reinforcement factor (which are therefore highly insulative) as the angle of inclination is controlled during winding by the laying of one layer onto another; if there were no reinforcement to reinforcement bearing relationship the binder would creep and the angle would be lost and, in the short term, the succeeding layers would slip: this could lead to insufficient and irregular thermal insulation properties combined with poor resistance to abolation due to incorrect location of the reinforcements;

it is a fortiori impossible to make materials based on cold vulcanizing silicon (RTV) elastomers with a relatively low reinforcement factor; this type of binder can only be used by direct impregnation; the fluidity of the binder gives rise to the same problem;

it is impossible to wind strongly conical bodies because the layers of reinforcement slip along the generatrix;

it is not possible to achieve good control over the position of the layers and of the interval between layers.

In a second method precut rings of woven fabric are stacked on each other. This very simple method has the same defects as previously described, often much accentuated, and additionally:

material is wasted because of the cutting, the method is time-consuming.

In another method the body to be protected has wound onto it a fringed strip incorporating support fibers running along the surface to be protected, from which extend appropriately inclined short fibers.

In a further method described in the patent FR-2.569.237 a fringed mesh is wound onto an intermediate former or onto the body to be protected itself, with the special feature that the fringed tape incorporates a mesh part directly exposed to the thermal flux.

Despite their undoubted advantages, these improved solutions suffer from the same disadvantages.

The invention is directed to alleviating the aforementioned disadvantages by proposing a thermal protection coating which represents an insulation/ mechanical strength trade-off which is a much better match to actual requirements than has been achieved in the past, particularly a much better thermal insulator than known coatings, so meeting the requirements for thermal and mechanical strength.

It is also directed to a method for the industrial scale manufacture of a coating of this kind and an installation for implementing this.

It therefore proposes a thermal protection coating for a surface to be protected comprising a reinforcement embedded in a first thermally insulative material and characterised in that it includes a main layer formed from a succession of substantially parallel refractory fibrous reinforcement layers inclined to the surface to be protected, between which are interleaved insulative layers essentially made up of said first insulative material, said main layer being lined with at least one sublayer extending along the surface to be protected and essentially being made of a second insulative material compatible with said first insulative material.

According to preferred features:

the reinforcement layers represent less than 30% by volume of the main layer;

the reinforcement layers represent between 10 and 20% by volume of the main layer;

the sublayer is in contact with the surface to be protected;

the coating has an axis of revolution and the reinforcement layers are inclined to this axis at an angle of inclination (by definition less than or equal to 90°) which is less than 60°;

the angle of inclination is between 30° and 60°;

the angle of inclination is between 40° and 50°;

the coating has an axis of revolution and the reinforcement layers and the insulative layers are formed by interleaved continuous windings;

the reinforcement layers comprise a woven silica tape;

the reinforcement layers are substantially equidistant;

the first insulative material of the insulative layers interleaved between the reinforcement layers is a lightened silicone type reference elastomer;

the second insulative material is identical to that of the insulative layers;

at least the second insulative material is a doped material adapted to provide, for example, protection against X-rays, as described in the patent FR-2.597.651;

the second insulative material is a cellular material;

the thickness of the sublayer is at least in the order of one tenth of a millimeter.

The invention also proposes a method of manufacturing a thermal protection coating for a surface to be protected characterised in that:

at least one sublayer of a thermally insulative material adapted to be parallel to the surface to be protected is deposited onto a support and polymerized if necessary;

then, in a continuous manner so as to build up progressively a main layer:

invariant and identical profile parallel grooves are machined into said sublayer;

at least one refractory fibrous reinforcement layer is placed in each groove so that an edge portion thereof runs along a flank of said groove and is inserted thereinto as far as its bottom;

an insulative layer of a first insulative material is deposited along each reinforcement layer to fill at least the groove;

the thickness of said insulative layer parallel to the associated reinforcement layer is formed to the required value; and said insulative material is polymerized.

According to preferred features:

said insulative material is polymerized as it is applied;

the combination of the sublayer and the main layer obtained in this way is machined to define its thickness perpendicular to the surface to be protected (this thickness may vary if necessary);

if the surface to be protected has an axis of revolution, a continuous groove is machined around said axis and, as said groove is machined, there is applied to every point of said groove and before the latter has progressed 360° from said point, a reinforcement tape forming a reinforcement layer, a bead of said first insulative material is spread along said tape and the thickness of the insulative layer obtained in this way is formed to the required value and the material is polymerized;

the support is the surface to be protected;

the support is an intermediate former.

The invention also proposes an apparatus for implementing the method characterised in that it comprises:

means for depositing at least an insulative sublayer;

a cutting tool adapted to form at least one groove in the sublayer;

an applicator member for applying at least one refractory fibrous reinforcement layer to each groove, against one flank thereof;

an injection nozzle for depositing a layer of insulative material along each reinforcement layer;

a tool for forming each insulative layer to the required thickness;

a polymerizing member for polymerizing the insulative material; and a machining tool for obtaining a required final profile of the coating.

Preferably:

said tools are carried, angularly offset, by at least one tool-holder which is part of a rotary machine such as a copier lathe or a numerically controlled lathe;

the machining tool is associated with a copying system different that a first copying system associated with the cutting tool, so that the thickness of the coating can be varied at will. The same result can of course be obtained with a numerically controlled machine.

Objects, characteristics and advantages of the invention will emerge from the following description given by way of non-limiting examples with reference to the appended drawings in which.

Figure 1:
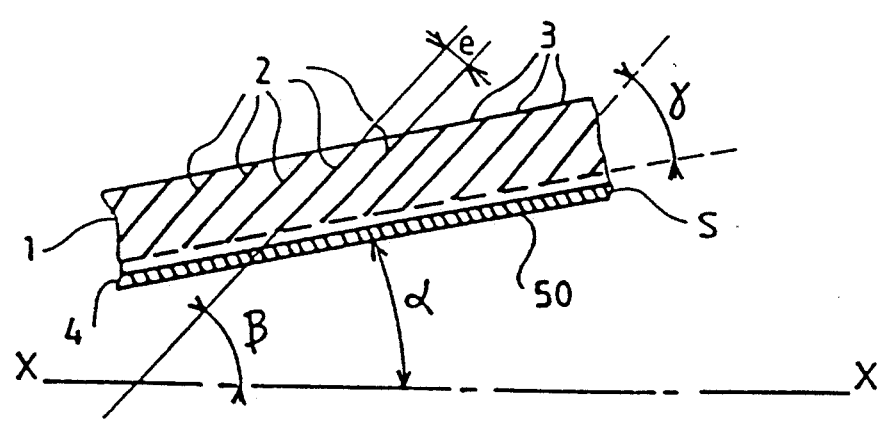
FIG. 1 is a view in cross-section of a coating in accordance with the invention.

The coating in FIG. 1 comprises a main layer 1 formed of a succession of refractory fibrous reinforcing layers 2 which are substantially parallel and in this instance equally spaced by a distance e and inclined at an angle $\gamma$ relative to the surface S of the body 50 to be protected. Thermally insulative layers 3 are interleaved between these reinforcement layers, which are preferably of a woven or fringed textile reinforcement. The main layer 1 is lined with an insulative sublayer 4 parallel to the surface S to be protected, in this instance in contact with it. In this instance this surface has an axis of revolution X—X. In this instance the body has a cone half-angle $\alpha$ and the inclination of the layers 2 relative to this axis is $\beta$ so that $\gamma = \gamma - \alpha$.

The coating is therefore made up of a reinforcement (a woven silica tape, for example) wound with a particular angle and sandwiched with a matrix forming a binder (of silicone elastomer, for example), the whole being bonded to an insulative sublayer.

It is similar in principle to the "CLINOSTRASIL" type material described previously but it is characterised by:

a very low reinforcement factor (preferably less than 30% by volume with respect to the main layer and more particularly between 10 and 20%);

a highly insulative matrix (a lightened silicone elastomer, for example) deposited by direct impregnation;

strongly inclined layers (the angle is $\beta$ is advantageously between 30 and 60°); it has been found that the angle $\gamma$ can take a very small value, possibly as low as 10°, representing a range of 0 to 50°, preferably 20 to 50°;

a pure matrix sublayer.

All these characteristics guarantee very good thermal insulation properties.

According to an essential characteristic of the invention a sublayer 4 is formed.

This sublayer enables:

anchoring of textile reinforcements during manufacture;

bonding, usually between the surface S of the body to be protected and the combined thermal protection coating (1+4);

improved thermal insulation characteristics.

The insulative sublayer 4 may be made from the same material as the insulative layers 3.

In some embodiments of the invention this sublayer may be made from a material different than that of the matrix 4 of the main thermal protection layer 1 (provided that these materials are compatible), in order to fulfill other functions, for example:

protection against X-rays, additional insulation by virtue of it being a cellular material.

Various stages of the process are shown in FIGS. 2 through 6.

Figure 2:
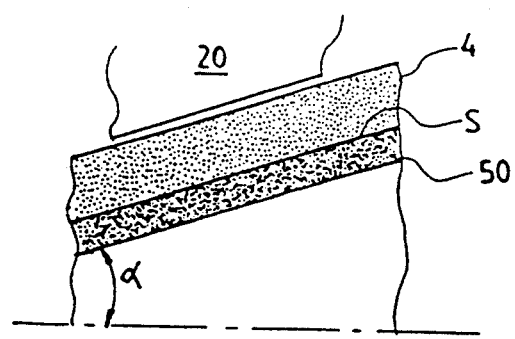
FIG. 2 is a view in cross-section showing the formation of a sublayer of this coating.
Figure 3:
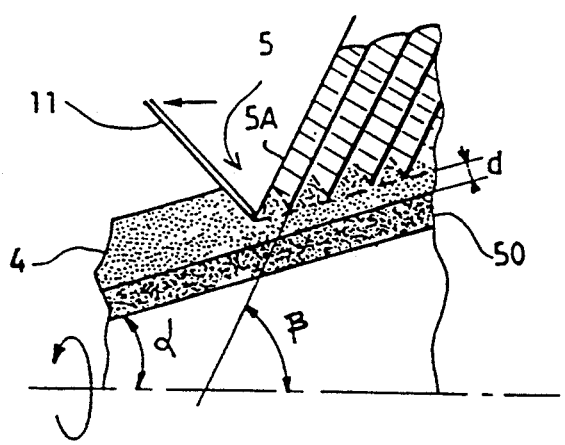
FIG. 3 is a view in cross-section showing the forming of a groove in a second stage.
Figure 4:
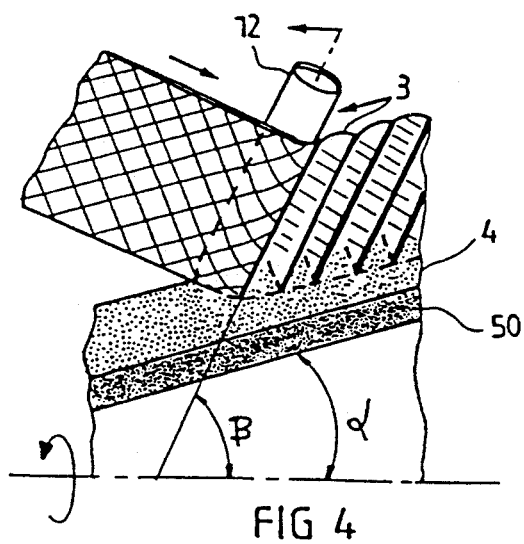
FIG. 4 is a view in cross-section showing the application of a reinforcement layer in a third stage.

Referring to FIG. 2, the sublayer 4 is formed directly on the surface S of the body to be protected (after application of an adhesion-promoting primer) or on a former (with a mould release agent), in this instance by moulding a layer of a material that is optionally identical to the material of the matrix using an appropriate device of any known type schematically represented at 20. The thickness must be slightly greater than the required final thickness of the sublayer.

The main layer 1 is then formed by a process that might be described as insertion winding.

Figure 5:
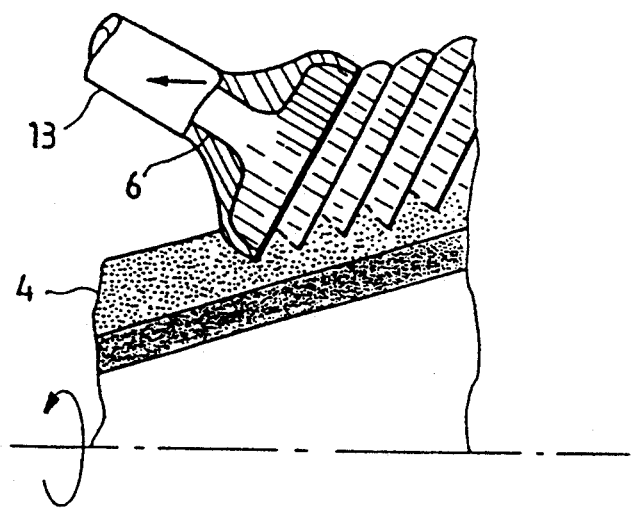
FIG. 5 is a view in cross-section showing the formation of an insulative layer in a fourth stage.
Figure 6:
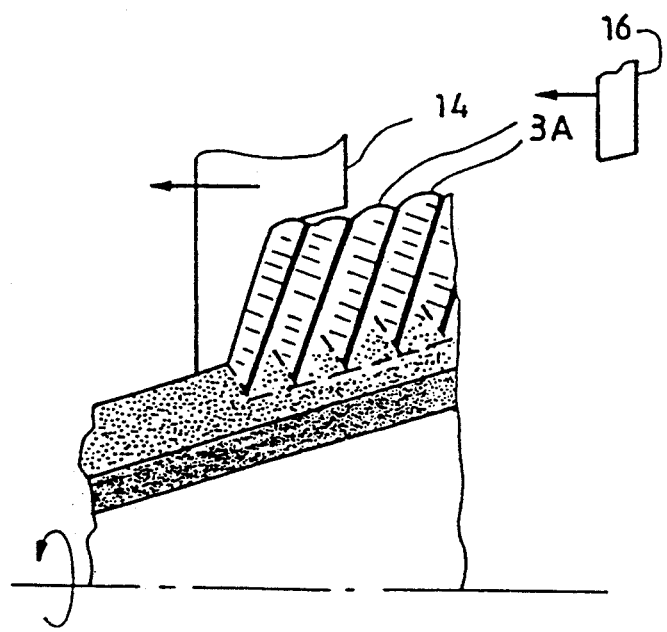
FIG. 6 is view in cross-section showing the forming to thickness of said insulative layer in a fifth stage.

After the sublayer 4 is polymerized the following operations are carried out continuously so as to build up the main layer progressively, for example on a specially adapted rotary machine 10 (see FIG. 7), starting from the larger diameter end in the case of a conical shape and with an angle $\beta < 90°$:

a continuous groove 5 is machined around the X—X axis with the required pitch by a cutting tool 11 (see FIG. 3); the groove must have one flank 5A inclined at the angle $\beta$; the bottom of the groove must be at a distance d from the surface S of the body to be protected corresponding to the required thickness of the sublayer (minimum value: a few tens of millimeters), the textile reinforcement strip 3 (a woven tape in FIG. 4) is inserted and wound into the groove, using an applicator roller 12, with one edge located at the bottom of the groove; the reinforcement must be applied by a guide 12 at the angle $\beta$ and must bear against the previous insulative layer 3';

a bead 6 of binder (matrix) previously (or continuously) catalyzed is deposited by an injection nozzle 13 into the groove 5 (see FIG. 5);

a tool 14 is used to form the deposit to the required thickness to improve impregnation of the reinforcement by the binder and to eliminate any excess material (see FIG. 6).

The main layer 1 is then polymerized, advantageously at the same time as it is formed to the required size and profile by means of a known tool schematically represented at 16 in FIG. 6.

Note that to improve the quality of the deposit it is advantageous to employ a deformable textile reinforcement (especially for small diameters).

The efficacy of this method results from the fact that the groove allows perfect anchoring of the textile reinforcement 3, which is placed exactly at the required location, and prevents any slipping, irrespective of the cone half-angle $\alpha$ of the body 50 and the angle $\beta$ of the reinforcement; as already explained, the angle $\gamma$ may be as small as 10°. What is more, the dimension machined at the angle assists with maintaining the inclination initially set by a support wedge. Finally, the presence of the groove facilitates the controlled deposition of the binder and limits runs.

This method therefore makes it possible to manufacture a coating of the FIG. 1 type very quickly and automatically with very high accuracy in respect of:

the reinforcement factor (related to the winding pitch), and the angle of inclination of the layers, irrespective of the profile of the body of revolution to be coated.

Figure 7:
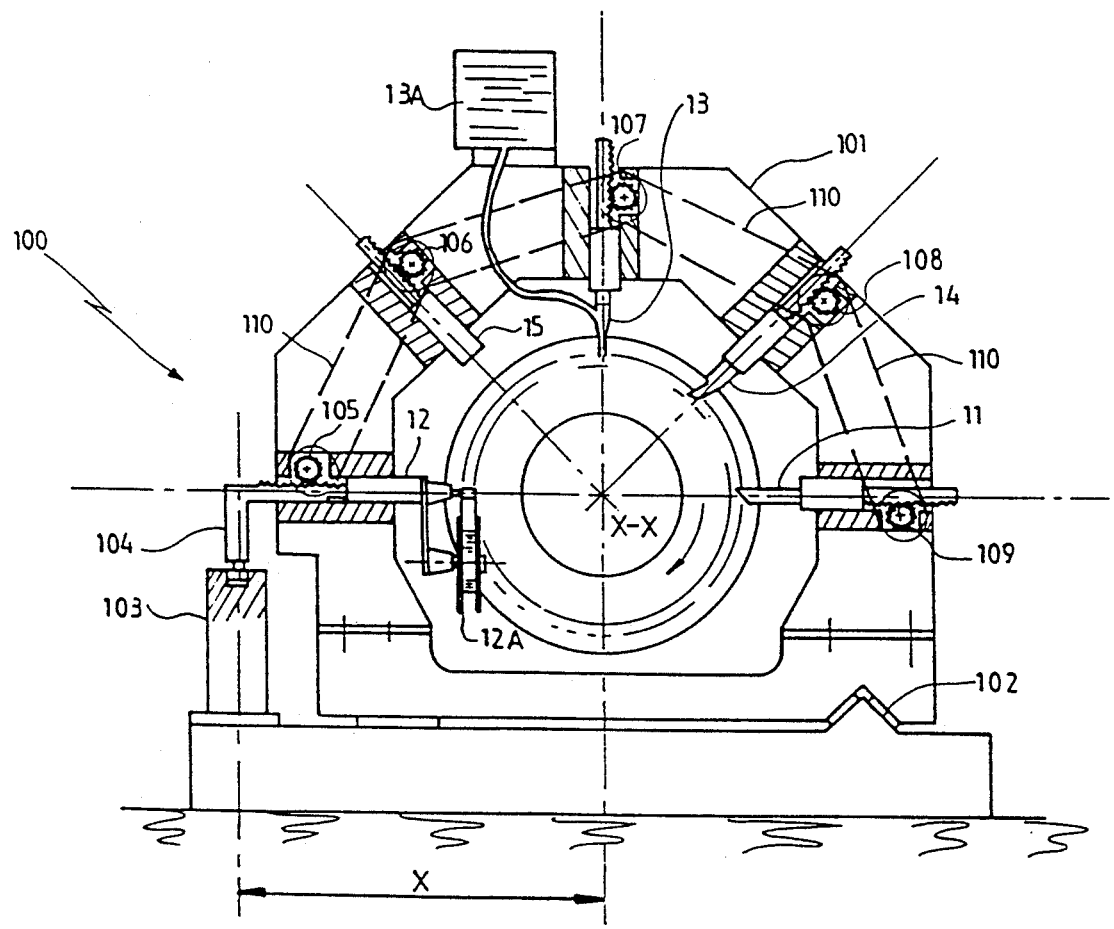
FIG. 7 is an end view of an installation for depositing a coating from FIG. 1 onto a body having an axis of revolution.

FIG. 7 shows schematically a machine for implementing the process in the case of FIGS. 2 through in which the body 50 whose surface S to be protected has an axis of revolution X—X.

In FIGS. 2 through 6 arrows show relative movement of the body 50 and the various tools: simultaneous axial forward movement and rotation movement, representing a generally helical overall relative movement.

However, it must be noted that the principle of the method from FIGS. 2 through 6 is not limited to bodies with an axis of revolution. The general principle of the invention teaches the protection of a portion of surface by forming multiple parallel sections of grooves. There could likewise be a plurality of interleaved continuous grooves with a radii varying as a function of the shape of the body to be protected.

Given the generally helical relative movement of each of the tools 11 through 14 relative to the body, the invention teaches fastening these tools together in the angular direction (FIG. 7).

In this example a rotary machine 100 (modified copying lathe) is equipped with a special carriage 101 implementing the machining, winding, impregnation and thickness forming functions while the body 50 to be protected is being rotated with no translation movement.

The four functions implemented on the carriage are tracked along the generatrix of the workpiece to be coated by a radial advance system synchronized with the lathe profile copier.

As can be seen from FIG. 7 the lathe 100 includes at least one tool-holder turret 101 carrying the angularly offset tools 11 through 14. The tool-holder 101 is mobile in translation along a rail 102.

Near the applicator tool 12 is a spool 12A of reinforcement tape and near the injection nozzle 13 is a tank 13A of binder.

Also provided on the tool-holder in this instance is a polymerization tool 15, in this instance an irradiating tool for polymerizing the binder disposed between the tools 12 and 13. There could likewise be provided on the same tool-holder 101 a peripheral machining tool for optionally smoothing the beads 3A from FIG. 6.

On the copying lathe is a copying groove 103 tracked by a roller carried by an angled arm 104 carrying one of the tools, in this instance the tool 12 for applying the reinforcement 2. The arm 104 is mobile in the radial direction relative to the tool-holder turret 101 and meshes with a toothed wheel 105. The other tools are also attached to radially mobile arms and mesh with similar toothed wheels 106 through 109 which are synchronized in rotation by chains 110.

It will be realized that the design of the machine represents a copying lathe correlating the local radius r of the body to be protected with the distance X between the copying groove 103 and the axis of revolution X—X.

As an alternative (not shown) the polymerization tool 15 and the final machining tool may be mounted on a second tool-holder which follows the first tool-holder at a distance of several rearward offset increments.

The final machining tool could equally well be fixed to a tool-holder fastened to the turret with its radial position slaved to a shape copier different than the basic copier (if the thickness of the coating had to vary longitudinally, for example).

The material was obtained during trial implementation of the method described previously with a reinforcement factor of approximately 15%, an angle $\beta$ of 45° and an angle $\beta$ varying from 10 to 20°; the sublayer was approximately 1 mm thick for a total thickness varying continuously between 4 and 8 mm.

It goes without saying that the previous description has been given by way of non-limiting example only and that numerous variations thereon may be put forward by those skilled in the art without departing from the scope of the invention.

What is claimed is:

1. A method of manufacturing a thermal protection coating for a surface to be protected and characterized in that:
    at least one sublayer (4) of a thermally insulative material adapted to be parallel to the surface to be protected is deposited onto a support (S);
    then, in a continuous manner so as to build up progressively a main layer (1);
    machining identical profile parallel grooves (5) into said sublayer;
    placing in each groove at least one refractory fibrous reinforcement layer (2) so that an edge portion thereof runs along a flank of said groove and is inserted thereinto as far its bottom;
    depositing an insulative layer of a first insulative material along each reinforcement layer to fill at least the groove;
    forming the thickness of said insulative layer parallel to the associated reinforcement layer to the required value; and
    polymerizing said insulative material.

2. Method according to claim 1 characterized in that said insulative material is a polymerized as it is applied.

3. Method according to claim 1 characterized in that the combination of the sublayer and the main layer obtained in this way is machined to define its thickness perpendicular to the surface to be protected.

4. Method according to claim 1 characterized in that if the surface to be protected has an axis of revolution, a continuous groove is machined around said axis and, as said groove is machined, there is applied to every point of said groove and before the latter has progressed 360° from said point, a reinforcement tape forming a reinforcement layer, a bead of said first insulative material is spread along said tape and the thickness of the insulative layer obtained in this way is formed to the required value and the material is polymerized.

5. Method according to claim 1 characterized in that the support is the surface to be protected.

6. Method according to claim 1 characterized in that the support is an intermediate former.

7. Method according to claim 2 characterized in that the combination of the sublayer and the main layer obtained in this way is machined to define its thickness perpendicular to the surface to be protected.

8. Method according to claim 7 characterized in that if the surface to be protected has an axis of revolution, a continuous groove is machined around said axis and, as said groove is machined, there is applied to every point of said groove and before th latter has progressed 360° from said point, a reinforcement tape forming a reinforcement layer, a bead of said first insulative material is spread along said tape and the thickness of the insulative layer obtained in this way is formed to the required value and the material is polymerized.

9. Method according to claim 8 characterized in that the support is the surface to be protected.

10. Method according to claim 8 characterized in that the support is an intermediate former.

* * * * *

UNITED STATES PATENT AND TRADEMARK OFFICE
CERTIFICATE OF CORRECTION

PATENT NO. : 5,232,534
DATED : August 3, 1993
INVENTOR(S) : Dominique HOCQUELLET It is certified that error appears in the above-indentified patent and that said Letters Patent is hereby corrected as shown below:

On the title page, Item [73]: Assignee, delete "Aerospatiale Soiete Nationale Industrielle", and insert therfor ---Areospatiale Societe Nationale Industruelle---.

Signed and Sealed this

Twelfth Day of July, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,232,534
DATED : August 3, 1993
INVENTOR(S) : Dominique HOCQUELLET It is certified that error appears in the above-indentified patent and that said Letters Patent is hereby corrected as shown below:

On the title page, Item [73]: Assignee, delete "Aerospatiale Soiete Nationale Industrielle", and insert therefor --Aerospatiale Societe Nationale Industrielle--.

This certificate supersedes Certificate of Correction issued July 12,1994

Signed and Sealed this

Twenty-eight Day of March, 1995

Attest:

BRUCE LEHMAN

Attesting Officer     Commissioner of Patents and Trademarks